(12) United States Patent
Walt, II

(10) Patent No.: US 10,928,804 B2
(45) Date of Patent: *Feb. 23, 2021

(54) SYSTEM AND METHOD FOR ASSEMBLING AND/OR TESTING ARTICLES

(71) Applicant: LM3 Technologies, Inc., Chicago, IL (US)

(72) Inventor: Michael A Walt, II, Chicago, IL (US)

(73) Assignee: LM3 Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,342

(22) Filed: Jun. 10, 2019

(65) Prior Publication Data
US 2019/0294146 A1    Sep. 26, 2019

Related U.S. Application Data

(63) Continuation of application No. 15/084,916, filed on Mar. 30, 2016, now Pat. No. 10,317,878.
(Continued)

(51) Int. Cl.
*G05B 19/4097*  (2006.01)
*G05B 19/418*  (2006.01)
*G05B 19/406*  (2006.01)

(52) U.S. Cl.
CPC ....... *G05B 19/4097* (2013.01); *G05B 19/406* (2013.01); *G05B 19/41865* (2013.01); *G05B 2219/31053* (2013.01); *Y02P 90/02* (2015.11)

(58) Field of Classification Search
CPC .......... G05B 19/4097; G05B 19/41865; G05B 19/406; G05B 2219/31053; Y02P 90/28; Y02P 90/20; Y02P 90/04; Y02P 90/02
(Continued)

(56) References Cited

U.S. PATENT DOCUMENTS 4,787,136 A * 11/1988 Majic ................... B23P 19/066
29/709
5,571,978 A * 11/1996 Gysi ....................... G01N 1/26
73/865.8
(Continued)

FOREIGN PATENT DOCUMENTS

WO         9839236 A1     9/1998

OTHER PUBLICATIONS

PCT International Search Report for counterpart International Patent Application No. PCT/GB2016/050889 dated Jun. 6, 2016.
(Continued)

*Primary Examiner* — Kenneth M Lo
*Assistant Examiner* — Mohammed Shafayet
(74) *Attorney, Agent, or Firm* — Husch Blackwell LLP; George S. Pavlik

(57) ABSTRACT

The present invention relates to a method for testing articles. The method comprises providing a plurality of test stations, a conveyor assembly and a central controller; using a first test station to perform tests on an article under a first testing schedule; determining identification information of the article by a sensor device as the article enters the first station; storing test completion information in relation to the corresponding identification information at the controller; wherein, if the test completion information indicates that all tests were performed, then updating a second testing schedule to confirm that no additional testing is needed at a second station; and wherein if the test completion information indicates that a test was not completed, then updating the second testing schedule so that, when the article is in the second test station, a not completed test can be performed to prevent the conveyor from having to be stopped.

11 Claims, 6 Drawing Sheets

Related U.S. Application Data

(60) Provisional application No. 62/140,161, filed on Mar. 30, 2015.

(58) Field of Classification Search
USPC .......................................................... 700/97
See application file for complete search history.

(56) References Cited

U.S. PATENT DOCUMENTS

| | | | | |
|---|---|---|---|---|
| 6,226,848 | B1* | 5/2001 | Kurtz | B23P 21/004 29/407.01 |
| 6,324,749 | B1* | 12/2001 | Katsuura | B23P 21/004 29/402.01 |
| 6,338,148 | B1* | 1/2002 | Gillenwater | G06F 11/2273 714/25 |
| 6,763,573 | B2 | 7/2004 | Walt, II | |
| 7,062,831 | B2 | 6/2006 | Walt, II et al. | |
| 2002/0032956 | A1* | 3/2002 | Walt, II | B25H 1/0021 29/525.01 |
| 2002/0170889 | A1* | 11/2002 | Faitel | B23K 26/02 219/121.63 |
| 2004/0055131 | A1* | 3/2004 | Ghuman | B25J 17/0216 29/429 |
| 2008/0103622 | A1* | 5/2008 | Hanses | G05B 19/4183 700/116 |
| 2008/0221721 | A1* | 9/2008 | Reed | G05B 19/418 700/109 |
| 2010/0213027 | A1* | 8/2010 | Co | G11C 29/56 198/346.1 |
| 2012/0018279 | A1* | 1/2012 | Laubli | B29C 43/08 198/345.1 |
| 2014/0100714 | A1* | 4/2014 | Linn | G01M 7/02 701/2 |
| 2015/0034703 | A1* | 2/2015 | Tanaka | B23K 37/04 228/182 |

OTHER PUBLICATIONS

Written Opinion of the ISA regarding counterpart International Patent Application No. PCT/GB2016/05889 dated Jun. 6, 2016.
LM3 Technologies, Inc., Partial Testing Notes v1.0, Faurecia Online Function Testing, 2011.
LM3 Technologies, Inc., FT to Station Limits Conveyor Interlock v1.0, Faurecia Online Function Testing—UF to Start, 2011.

* cited by examiner

| Part No. | Test A | Test B | Test C | Overflow |
|---|---|---|---|---|
| 001 | Yes ☒<br>No ☐ | Yes ☒<br>No ☐ | Yes ☒<br>No ☐ | Yes ☐<br>No ☒ |
| 002 | Yes ☒<br>No ☐ | Yes ☐<br>No ☒ | Yes ☒<br>No ☐ | Yes ☒<br>No ☐ |
| 003 | Yes ☒<br>No ☐ | Yes ☒<br>No ☐ | Yes ☐<br>No ☒ | Yes ☒<br>No ☐ |
| 004 | Yes ☒<br>No ☐ | Yes ☐<br>No ☒ | Yes ☐<br>No ☐ | Yes ☐<br>No ☐ |
| 005 | Yes ☒<br>No ☐ | Yes ☐<br>No ☐ | Yes ☐<br>No ☐ | Yes ☐<br>No ☐ |

Fig. 6

SYSTEM AND METHOD FOR ASSEMBLING AND/OR TESTING ARTICLES

CROSS REFERENCE TO RELATED APPLICATION

This application is a continuation of and claims priority to U.S. patent application Ser. No. 15/084,916 filed on Mar. 30, 2016, now allowed, which claims priority to U.S. Provisional Patent Application No. 62/140,161 filed on Mar. 30, 2015 the entirety of these application are hereby incorporated by reference as if set forth fully herein.

The present invention relates to a system and method for assembling and/or testing articles, such as articles of manufacture, and more particularly articles of mass production, such as automotive parts/components and the like.

Progressive assembly and testing systems are generally known for sequentially carrying out a series of operations on articles of mass production, such as for example testing or assembling automotive parts/components and the like. Such assembly and testing can be performed in connection with one or more assembly lines or conveyor systems which move the articles of manufacture through one or more testing/assembly stations. Representative systems and methods are generally described in U.S. Pat. Nos. 6,763,573 and 7,062,831 which are hereby incorporated by reference as is fully set forth herein.

FIG. 1 of the subject application illustrates a representative station for assembling vehicle seats according to known systems. Generally, during such a process, an article will be moved into a station where it will be subject to one or more operations. Such operations may be related to manufacturing or assembling the article or carrying out testing to verify proper functioning, operation or quality control. Typically, the system is programmed to move the articles through the conveyor assembly according to predetermined time parameters such that an article is at a single station for a set amount of time before it is moved along the assembly. Such practice enables multiple articles to be routed through the system simultaneously.

During such test/assembly processes, occasionally, when an article is at a test/assembly station, certain testing/assembling will not be completed in the predetermined time interval and additional time will be needed. Thus, an operator or attendant will usually have to manually stop or interrupt the conveyor assembly to allow for completion of the test/assembly. Such practice can cause significant delays to the testing process. Over time, such delays can have a substantial and adverse effect on productivity.

Thus, a system and method is needed for dynamically managing and controlling an assembly/testing process such that the system does not need to be interrupted in order to complete certain delayed tests. From the following, persons of ordinary skill in the art will recognise and understand that embodiments presented herein address such needs and have additional benefits and advantages over known practices.

In a first embodiment, the invention relates to a system for assembling and/or testing articles, the system comprising a plurality of stations adapted to hold and/or test articles. The system further comprises a conveyor assembly connecting the plurality of stations and adapted to move articles between the stations at predetermined time intervals. A central controller is connected to at least one of the stations, wherein the central controller is adapted to receive and store assembly and/or test step completion information from the at least one station at the end of each time interval. The assembly and/or test step completion information may indicate whether or not a particular test and/or assembly step was completed within the predetermined time interval. This step completion information is stored in the central controller of the present system before the article is moved to the next station.

According to the first embodiment, the operator or attendant will not have to manually stop or interrupt the system to allow for completion of the test/assembly step. Rather, if the predetermined time interval was not sufficient to complete the assembly/test process, the step completion information stored by the central controller will be a marker for the incomplete test/assembly step, which can then be performed or resumed at another test station further down the line. As such, the present system is adapted to move the articles along the conveyor assembly at the end of the predetermined time intervals, even if none or not all of the scheduled assembly/testing steps have been performed at one or more of the stations.

The term "step completion information", therefore, does not refer to results that indicate whether or not an article fulfils a set of quality standards. Rather, the "step completion information" is a status update about the successful completion of a test or assembly step, irrespective of the article specific quality information a completed test/assembly step may provide. In its simplest form, the "step completion test" can be a binary "1" for "test/assembly step completed" and a "0" for "test/assembly step not completed" before the end of the predetermined time interval.

The system of the present invention is particularly useful in production lines with large numbers of test/assembly stations, as conventionally all of the stations would have to wait for the slowest station to finish the assembly/testing processes assigned thereto.

According to another embodiment, the central controller is connected to each of the plurality of stations and adapted to receive and store assembly and/or test step completion information from each station at the end of each time interval. The system may further comprise at least one sensor device being adapted to determine the identification information of each article entering the at least one station, wherein the central controller may comprise a database and can be adapted to store the step completion information provided by the at least one station in relation to the corresponding identification information in the database. When an article enters one of the stations of the present system, the at least one sensor device may be used to detect the identification information of said article before testing/assembly is performed. The sensor device may be an automatic sensor, such as a barcode scanner that is attached to the test stations. Alternatively, the at least one sensor device many be manually operated by an attendant. The central controller can dynamically access and override the test/assembly data present in the database.

Accordingly, as the article moves along the system of the present invention, the database will accrue test/assembly step completion information.

According to another embodiment, the database may comprise an assembly and/or testing schedule corresponding to the identification information of each article entering the stations, wherein the central controller is adapted to provide the assembly and/or testing schedule to the at least one station. Each of the articles may have an individual assembly and/or testing routine, which is encoded in the assembly and/or testing schedule that is stored in the database. The assembly and/or testing schedule of each article is stored together with the individual identification information and can be used by the central controller to determine the assembly/testing steps which need to be carried out at each respective testing station.

In another embodiment, the central controller may be adapted to access and dynamically update the assembly and/or testing schedule to reflect the assembly/test step completion information received from the at least one station. By way of example, the assembly and/or testing schedule within the database may comprise an array of different assembly and/or testing steps to be performed for each individual article. If an article leaves one of the stations without completing all of the assigned assembly and/or testing steps, the central controller will receive a signal (assembly/test step completion information) indicating the incomplete assembly/testing result from said station and updates the assembly and/or test information of the database accordingly. In particular, the controller may add which test has been successfully/unsuccessfully performed at a specific station for each article. The updated assembly and/or test information can then be used to resume and/or restart the interrupted assembly and/or testing process at a station further down the line.

According to another aspect, at least one of the plurality of stations comprises a display device connected to the central controller, wherein the display device is adapted to visually display the assembly and/or testing schedule providing by the central controller. This is particularly useful if some or all of the assembly/testing steps are performed manually by a controller, who can therefore be instructed by the central controller via the display device. The central controller may instruct the operator to perform steps dependent on the successful/unsuccessful assembly/testing routines performed in previous stations.

In another embodiment, each station comprises a control unit adapted to obtain and forward the assembly and/or test step completion information for each article to the central controller. Accordingly, the system of this embodiment is a de-centralised system that can be used to ultimately control the method steps of its respective assembly/testing station.

The control unit may be adapted to automatically obtain the assembly and/or test step completion information from its respective test station. To this end, each test station may have a plurality of sensors to monitor how many of the required steps have been completed. Alternatively, it is also feasible to provide a user interface at the control unit, which can be used by the operator to input the assembly/test step completion information manually.

In another embodiment, the conveyor assembly comprises position sensors adapted to detect the position of each article within the system. Furthermore, the central controller may be adapted to display the relevant assembly and/or testing schedule on the display device as soon as an article enters one of the stations. In an alternative embodiment, the system may comprise a connector plug adapted to be manually or automatically connected to an article when the article enters one of the stations. The connector plug can be used to simultaneously read the identification information, such as a serial number, of the respective article and perform various electric tests.

In another embodiment, the system further comprises an overflow test station separate from the plurality of stations and adapted to hold and/or test articles. In other words, the overflow test station is not arranged in series with the plurality of assembly/test stations and intended for completion of tests and/or assembly steps that could not be finished in one of the regular assembly/testing stations.

As such, the overflow test station may be connected to the central controller and adapted to perform assembly/testing steps depending on the updated assembly/testing schedule provided by the central controller. Of course, articles which were completely assembled/tested before the end of the assembly/testing line of the present system, do not need to be moved to the overflow test station.

The present invention further relates to a method of assembly and/or testing articles, comprising:
providing a plurality of stations adapted to hold and/or test articles, a conveyor assembly connecting the plurality of stations and adapted to move articles between the stations, and a central controller;
providing at least one of the plurality of stations with an article;
performing at least one assembly/testing step in the at least one station for a predetermined time interval;
at the end of the predetermined time interval, determining for the at least one station if the at least one assembly/testing step was completed and providing the central controller with assembly and/or test step completion information on basis thereof;
storing the step completion information in a database;
moving the at least one article to the next station/end of the system by means of the conveyor assembly.

As mentioned previously, the articles are moved downstream even if some or all of the assembly/testing steps in at least one of the stations were not successfully completed.

Embodiments of the subject invention are generally directed to a system and method for testing or assembly articles of manufacture and more particularly to a system and method that can dynamically manage and control a progressive assembly or testing process by logging incomplete operations to be initiated or resumed at a subsequent stage. Embodiments of the invention will now be described by way of example only, with reference to the accompanying figures.

FIG. 6 is a representative tabular diagram of a test database according to embodiments presented herein.

Figure 1:
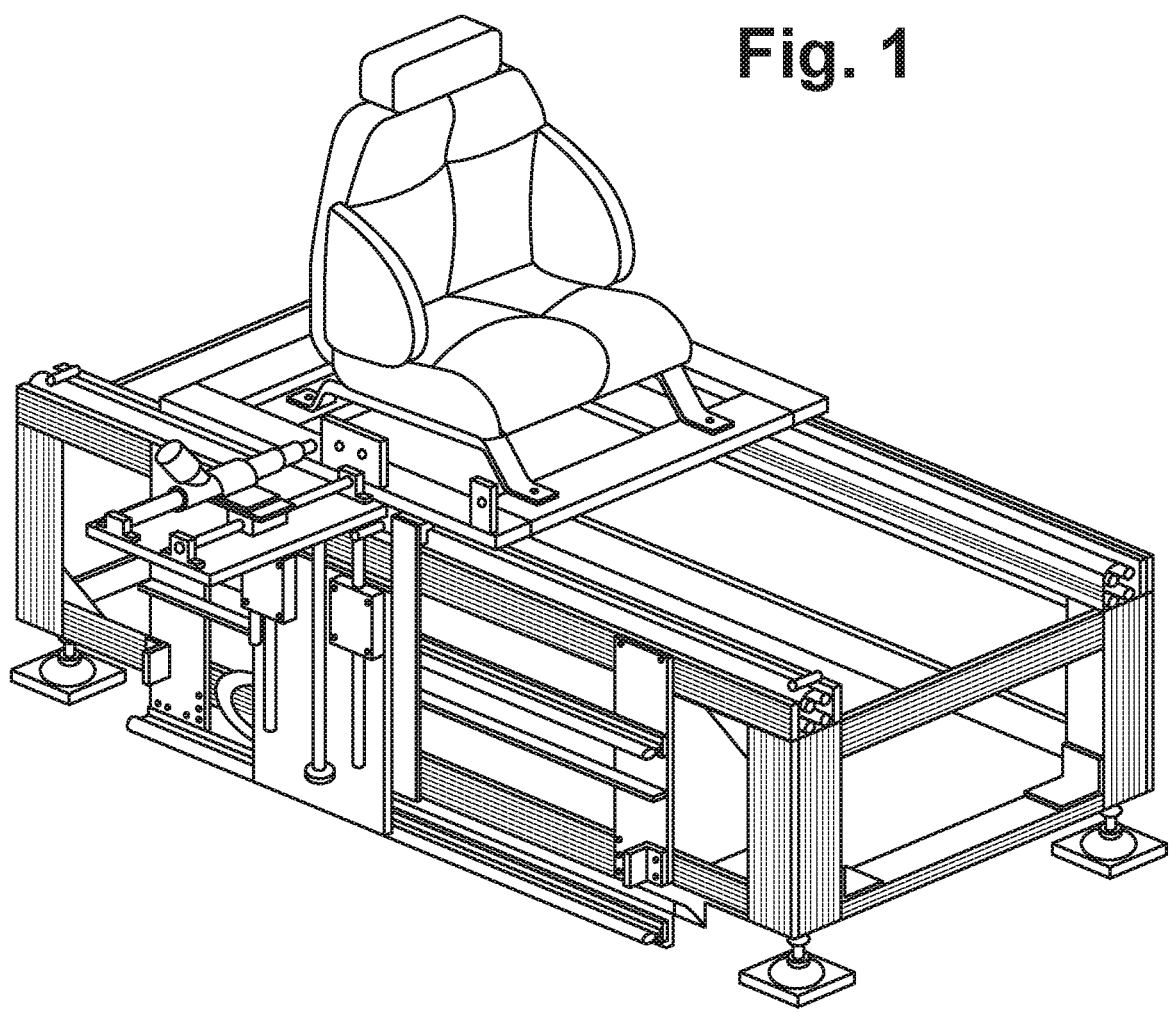
FIG. 1 is a perspective view illustrating an exemplary assembly station for vehicle seats according to the prior art.
Figure 2:
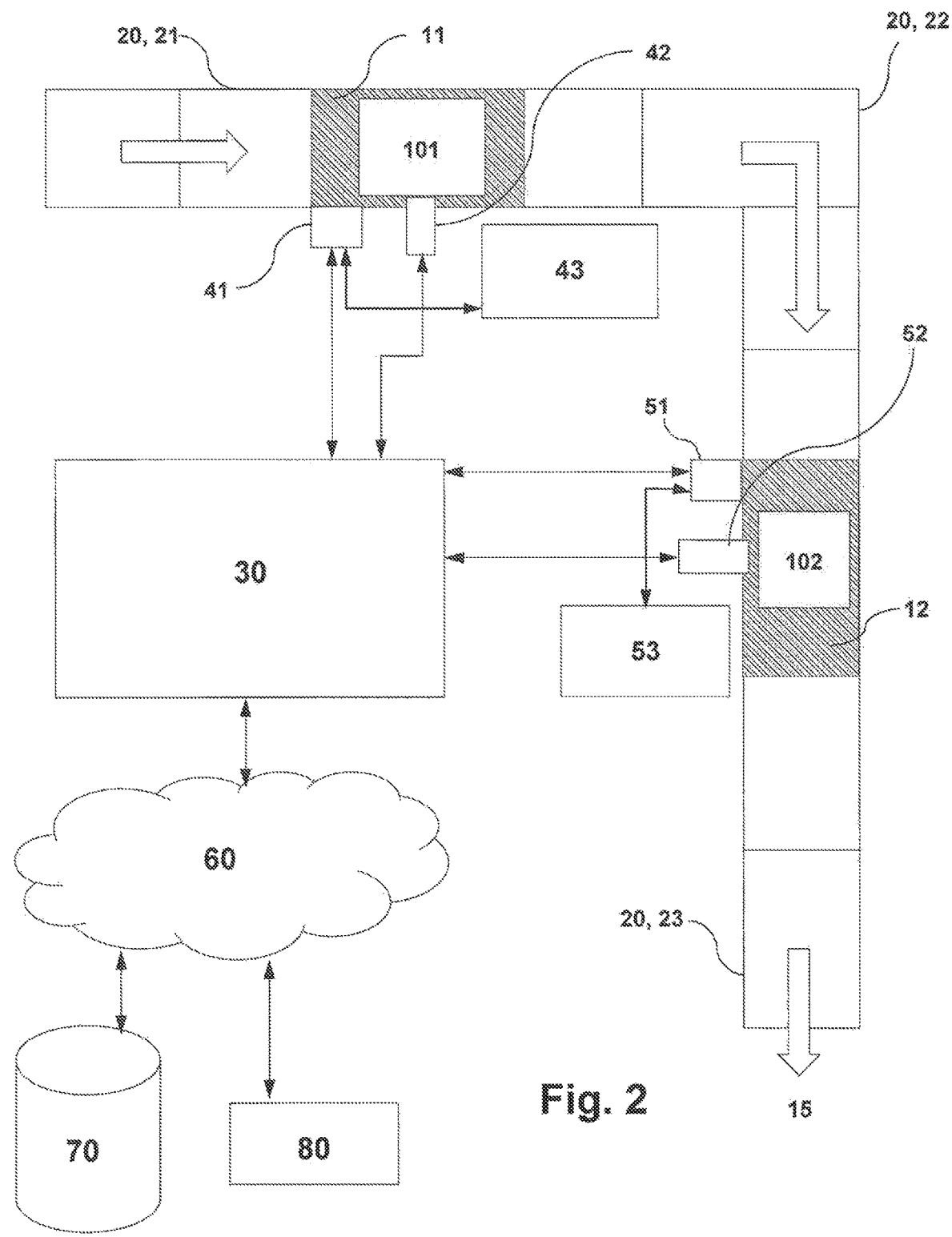
FIG. 2 is a schematic diagram illustrating a system according to embodiments presented herein.

FIG. 2 illustrates a system according to embodiments presented herein. According to such embodiments, the system can include one or more conveyor assemblies 20, 21, 22, 23, with one or more test stations 11, 12. The test stations 11, 12 can include an electronic control unit 41, 51 which can be connected via wired or wireless connection to a central computer and central controller 30 that can communicate with the test station control units 41, 51 to monitor and control the system. The test stations 11, 12 can additionally include a detachable connector/adaptor/plug 42, 52 that can be removably connected to the test article and an electronic display 43, 53 that can visually present information to an operator or attendant at the test station.

The central computer/controller (30) can include a programmable processor, control circuitry and executable control software as would be understood by one of ordinary skill in the art. The executable control software can be stored on a transitory or non-transitory computer readable medium, including, but not limited to, local computer memory, read-only memory (RAM), optical storage media, magnetic storage media, flash memory and the like.

The central controller 30 can include a database storing an assembly/testing schedule of all tests to be performed by the system and records for each article to be tested. As set forth more fully below, during the test process, the central controller 30 can dynamically update the database based on information received by the test station 11, 12. For example, for each article, the database can store assembly and/or test step completion information regarding tests that have been fully completed and tests yet to be completed, including tests that were not finished during a particular test time interval.

Figure 3:
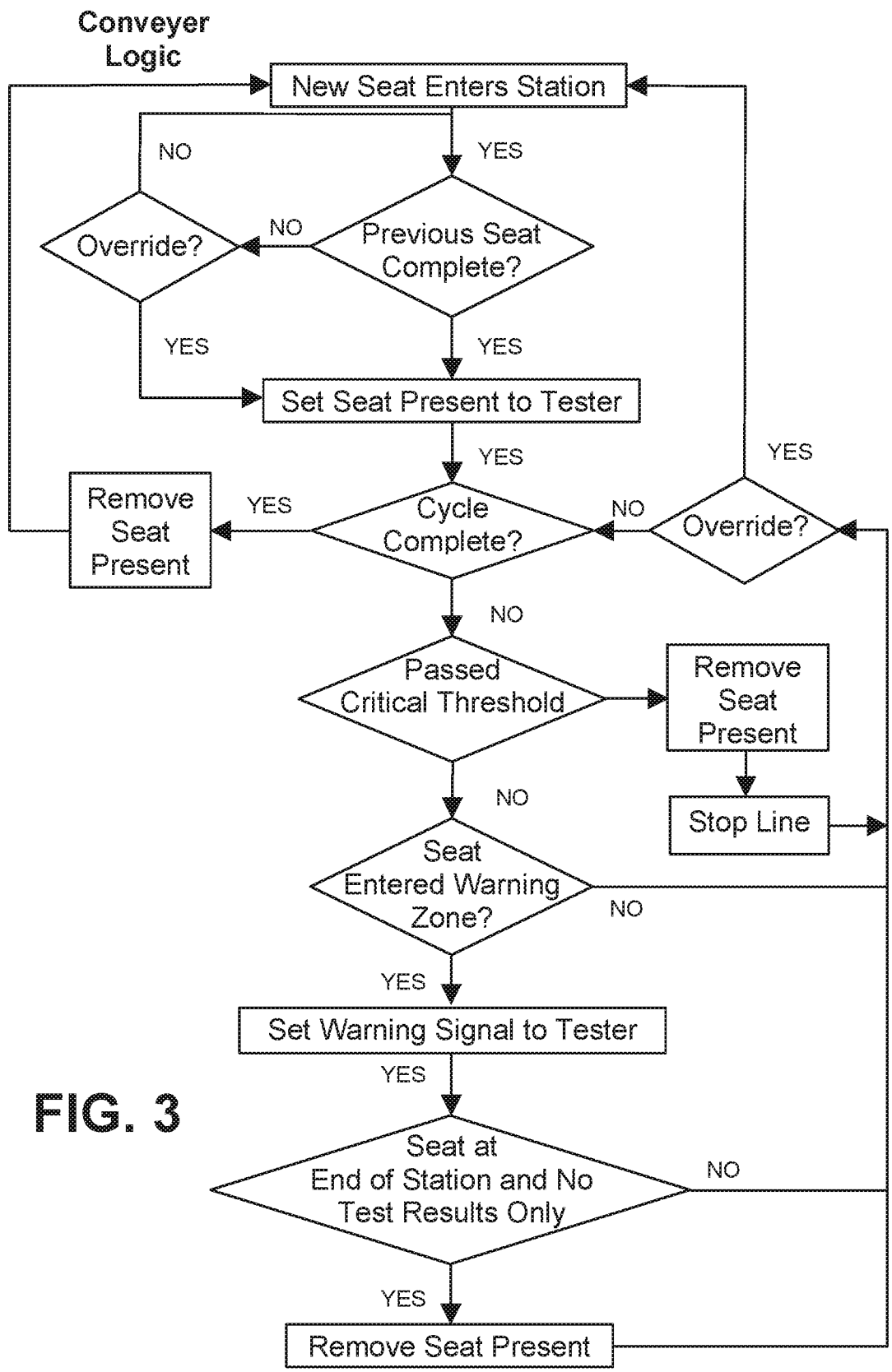
FIG. 3 is a flow diagram illustrating a sequence of operations for controlling a conveyor assembly according to embodiments presented herein.
Figure 4:
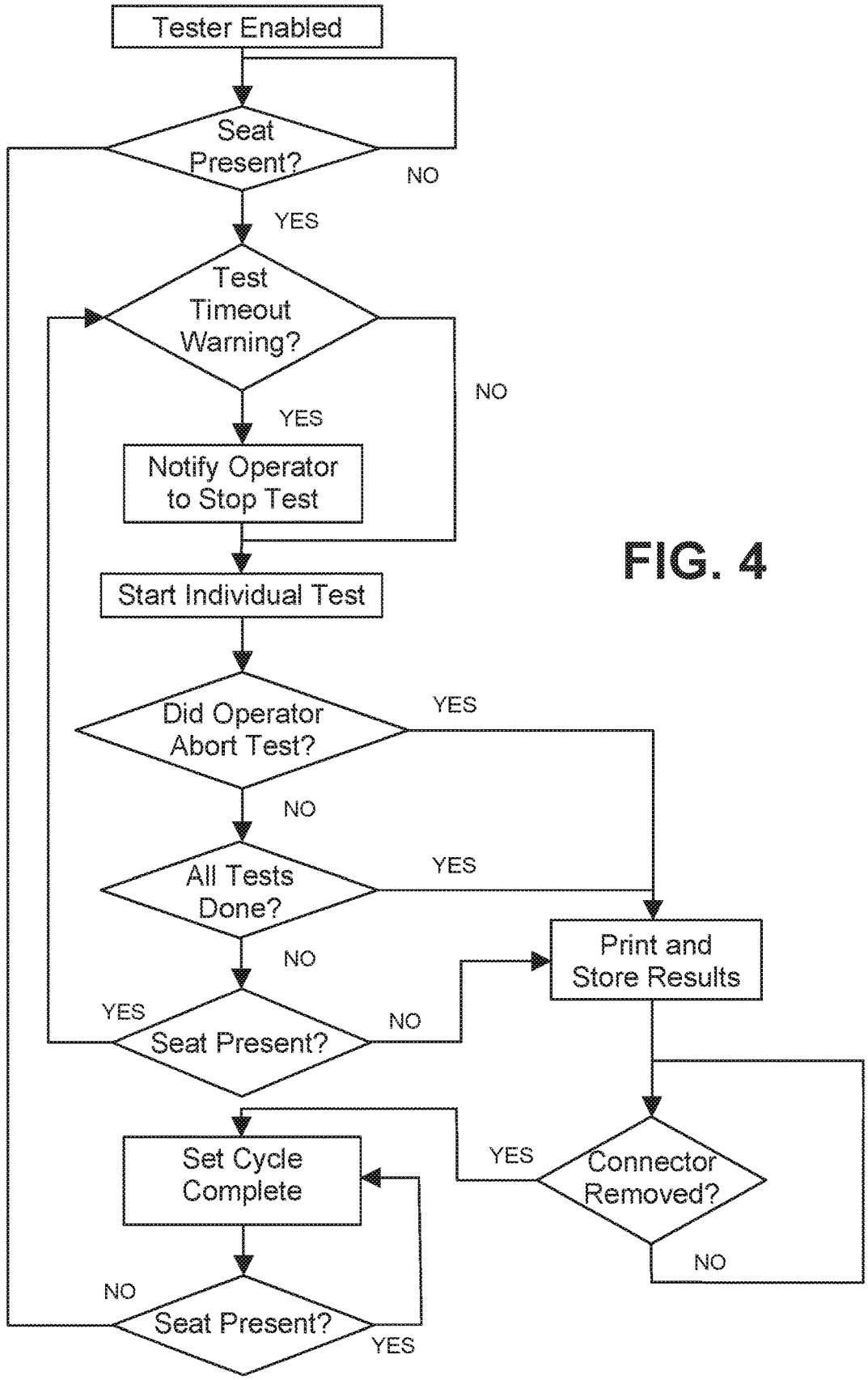
FIG. 4 is a flow control diagram illustrating a sequence of operations for controlling a process according to embodiments presented herein.
Figure 5:
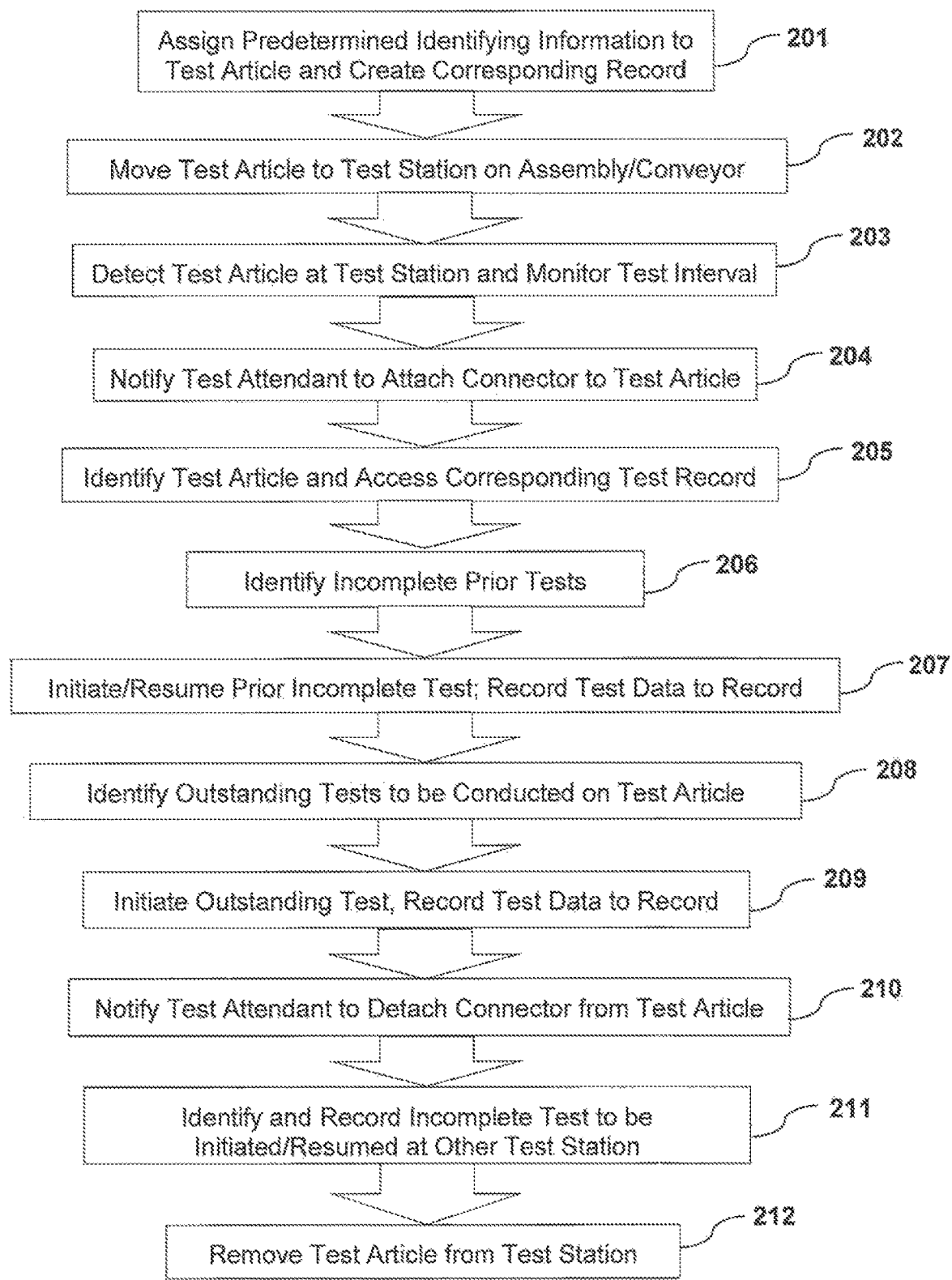
FIG. 5 is a flow control diagram illustrating a method for managing and controlling a testing process according to embodiments presented herein.

FIGS. 3 to 5 are flow control diagrams which illustrate methods and operations according to embodiments set forth herein. In a first step 201, and with particular reference to FIG. 5, an article can be assigned predetermined identification information, such as for example an identification serial number, and a corresponding record for the article can be created in the database. The identifying information for the article can be associated or affixed to the article, such as for example by way of an RFID tag or label affixed to the exterior of the article or the article can include identifying information in electronic form such as by way of computer code or sequence which can be electronically accessed by the system.

In a second step 202, one or more conveyor assemblies 20, 21, 22, 23, can be used to move or transport articles 101, 102 through the series of testing stations 11, 12. The conveyor can move at a predetermined fixed speed and can include position or proximity sensors which can detect when an article arrives at or leaves a test station. The sensors can additionally transmit electronic signals to the central unit 41, 51 and central controller 30. When an article enters a test station, the central controller 30 can instruct the electronic display 43, 53 to visually present instructions to an operator or attendant to plug or attach the connector device/plug 42, 52 to the article. 101, 102. Test stations 11, 12 can additionally include audio transducers which can audibly alert or instruct the attendant to insert the connector device/plug 42,52. The display 43,53 can additionally instruct the operator or test attendant to scan the RFID tag with a reader which can be connected to the test station controller. The control unit 41, 51 can process the identifying information for the article 101, 102 and communication with the central controller 30 to record the time of test initiation and completion and control the test operations in view of a predetermined time interval allowed for the test.

In initiating testing on the article 101, 102, the control unit 41, 51 can communicate with the central computer/controller 30 by sending a signal to the central controller 30 with the identifying information for the article 101, 102. In response, the central computer/controller can access the testing schedule (step 205) for the article 101, 102, determine the tests to be performed on the article 101, 102 and send instructions to the control unit 41, 51 to perform the one or more of the tests. The test station can then initiate the testing and obtain the test step completion information.

Upon the conclusion of the testing, or at the expiration of the predetermined time interval allowed for the test period, the operator or attendant can be visually notified via the electronic display 43, 53 or by other audible signals to disconnect the connector device/plug 42, 52. Once the connector device/plug 42, 52 is disconnected, the conveyor assembly 20, 21, 22, 23, can move the article 101, 102 out of the test station 11, 12. The controller 30 can then record the time the device/plug 42, 52 was disconnected.

At the conclusion of such testing, the control unit 41, 51 can communicate with the central computer/controller 30 to report step completion information regarding the testing (step 206). Such step completion information can include, for example, tests that were successfully performed on the article and whether all tests were completed; successful (PASS) and unsuccessful (FAIL) test outcomes; tests that were initiated but were not able to be completed, and tests that were not able to be initiated during the test interval. The central computer/controller 30 can access the testing schedule for the article and dynamically update the database record to reflect the test step completion information received from the test station control units 41, 51.

FIG. 6 illustrates a diagram of a representative test database in tabular form. As can be seen, the database can maintain individual records of each article, a list of all tests to be completed on the articles and the outcomes of such tests. The database can additionally track whether an article should be routed to an overflow test station 15 for additional testing. If desired, the database can be accessible at the central computer/controller 30 by way of an electronic display. The central controller 30 can additionally, or alternatively, be connected to other electronic devices 80 via a public or private data network 60 where information from the database can be remotely downloaded, accessed, displayed, stored or printed. Such remote electronic devices 80 can include, for example, computers or servers, handheld devices such as cell phones, smart phones, tablets or the like, or electronic displays or printers. Moreover, the central controller 30 can be connected to a local or remote server 70 via the public or private data network 60. The remote server 70 may be used to store or backup the database of the central controller 30.

Where the system includes multiple test stations 11, 12, the conveyor assembly 20, 22 can move the article into a second or downstream test station 12 and the process described above can be repeated. Specifically, an operator will be notified to attach a connector 52 to the article 101, 102 and the test station control unit 51 at the second test station 12 can access identifying information regarding the article 101, 102. The test station control unit 51 can then communicate with the central computer/controller 30 by sending a signal to the central controller 30 with the identifying information for the article. In response, the central computer/controller 30 can access the testing schedule record for the article and determine the remaining tests to be performed on the article. This can include identifying any tests which were initiated but not successfully completed at a prior test station 11.

Where a particular test was previously initiated at an earlier test station, but not successfully completed, the central computer/controller can send instructions to the second test station 12 to perform or resume the incomplete test (step 207). The second test station can then initiate the testing and record the test step completion information data. It is preferred, but not required, that testing at the second test station 12 commence with any test that was previously initiated but not completed at the first test station 11. Alternatively, where testing at an earlier test station was fully completed, the central controller 30 can instruct the control unit to start with the next test identified in the test schedule.

Again, after the predetermined test time interval has lapsed, outstanding tests to be conducted on the test articles 101, 102 are identified by the control unit 51 of the second test station 12 and communicated to the central controller 30 as test step completion information (step 208). The central controller 30 can then updated the test information record of the database with the various information received from the control unit 51. Once the database of the central controller 30 has been updated, a test attendant can be instructed by the display 53 to detach the connector plug 52 from the test article 101, 102, before said article is moved further along conveyor assembly 20, 21, 22, 23 (step 210).

If desired, the system can additionally include overflow test stations 15 for performing or completing any outstanding tests which were unable to be successfully completed at the primary testing stations (step 211). Such overflow test stations can be downstream from the primary test stations (step 211) and where the system recognizes that additional testing is needed on a particular article 101, 102, the central controller 30 can communicate with a conveyor assembly controller to route the article to the overflow test station to complete the outstanding tests. Testing at overflow test stations 15 can be performed under the same time parameters as the primary stations 11, 12 or the overflow stations 15 can be programmed to carry out testing without following any predetermined time schedule.

It will be recognized by persons of ordinary skill in the art that such system and methods represent a novel improvement over known practices in that it can quickly and efficiently manage and complete a test or assembly process without having to stop or interrupt the assembly line or conveyor. The present invention is not restricted to the specific embodiments shown in the drawings. In particular, the system may comprise any number of test/assembly stations, some of which could be arranged in parallel rather than in series.

The invention claimed is:

1. A method for testing articles, the method comprising the steps of:
   providing a first station that is adapted to test an article when it is disposed in the first station;
   providing a second station that is adapted to test the article when it is disposed in the second station;
   providing a conveyor assembly that is connected to the first station and that is adapted to move the article into, through and out of the first station;
   providing a central controller that is connected to both of the first and second stations, the central controller also comprising a database;
   using the first station to cause at least two or more tests to be performed in accordance with a first station testing schedule stored in the database on the article during a time interval of when the article is disposed within the first station and also is electrically connected thereto;
   using at least one sensor device that is adapted to determine identification information of the article as it enters the first station via the conveyor;
   using the central controller to store test completion information provided by the first station in relation to the corresponding identification information in the database;
   wherein, if the test completion information stored in the database from the first station indicates that all tests in the testing schedule were performed during the time interval, then updating a second station testing schedule to confirm that no additional testing needs to be done on the article at the second station; and
   wherein if the test completion information stored in the database from the first station indicates that one or more tests were not completed during the time interval, then updating the second station testing schedule so that, when the article is disposed in the second station, the one or more not completed tests can be performed on the article to thereby prevent the conveyor from having to be stopped.

2. The method of claim 1, wherein the conveyor is adapted to move the article into, through and out of the second station.

3. The method of claim 1, wherein the second station comprises an overflow station.

4. The method of claim 3, wherein the overflow station is not connected to the first station.

5. The method of claim 1, wherein the article comprises a seat.

6. The method of claim 5, wherein the article comprises a vehicle seat.

7. The method of claim 1, wherein the sensor device comprises an automatic sensor device.

8. The method of claim 7, wherein the automatic sensor device comprises a barcode scanner.

9. The method of claim 8, wherein the barcode scanner is attached to the first station.

10. The method of claim 1, wherein the sensor device is manually operated.

11. The method of claim 1, further comprising the step of updating of the second station testing schedule by the central controller to require that any testing of the article at the second station commence with any tests that were not completed at the first station.

* * * * *